Apr. 24, 1923.
R. POLK
MEANS FOR PEELING CITRUS FRUIT
Filed Dec. 19, 1922
1,452,930
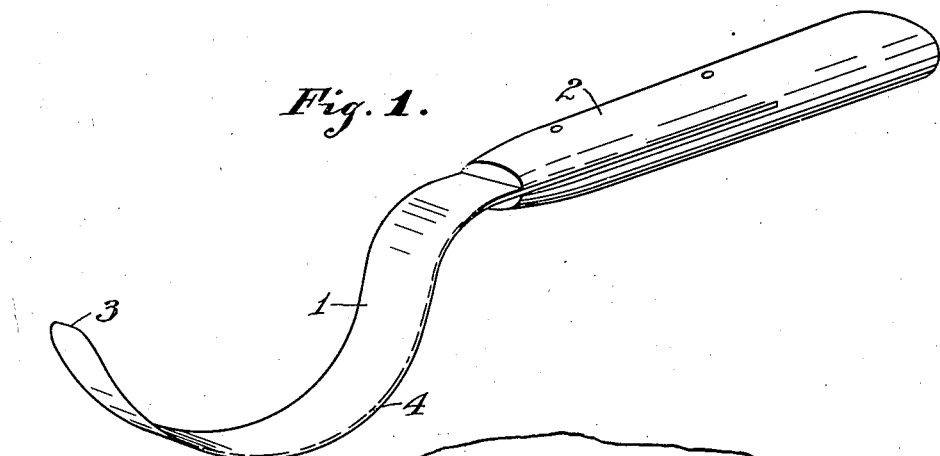
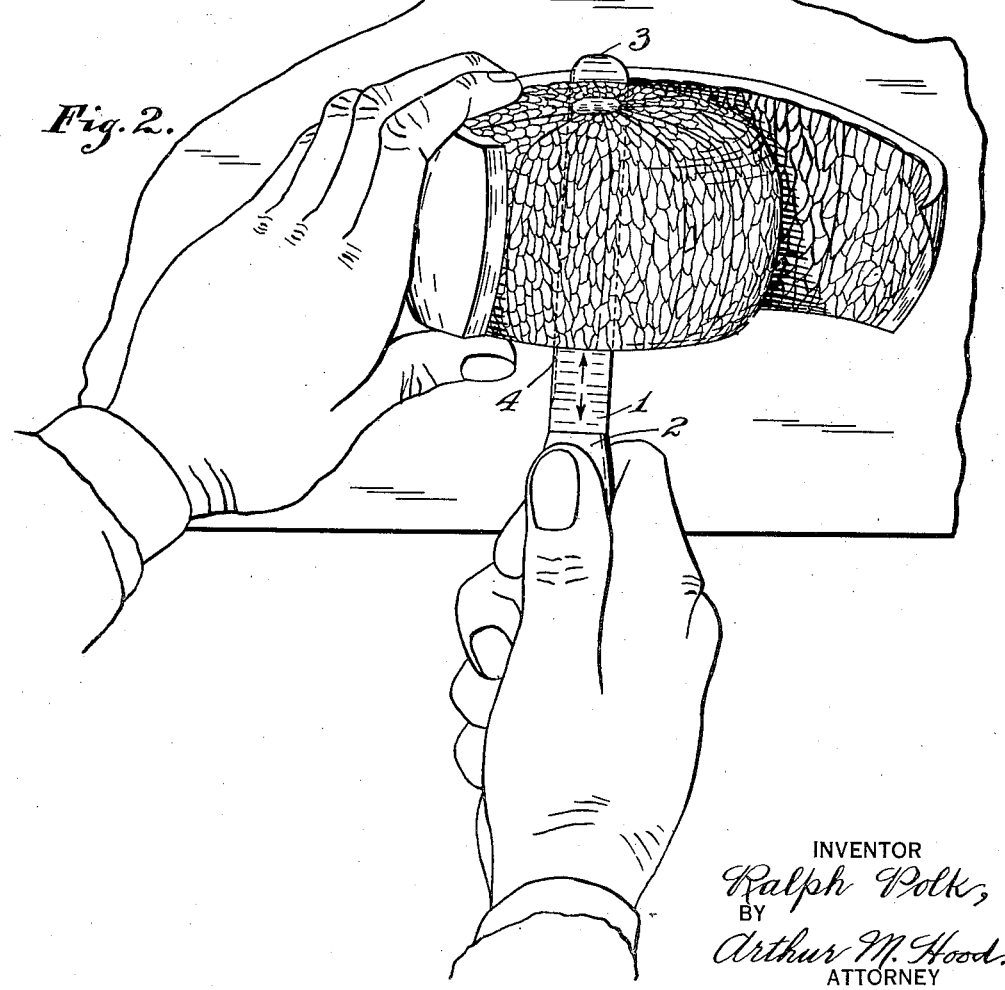
INVENTOR
Ralph Polk,
BY
Arthur M. Hood.
ATTORNEY Patented Apr. 24, 1923.

1,452,930

UNITED STATES PATENT OFFICE.

RALPH POLK, OF GREENWOOD, INDIANA.

MEANS FOR PEELING CITRUS FRUIT.

Application filed December 19, 1922. Serial No. 607,844.

*To all whom it may concern:*

Be it known that I, RALPH POLK, a citizen of the United States, residing at Greenwood, in the county of Johnson and State of Indiana, have invented a new and useful Means for Peeling Citrus Fruit, of which the following is a specification.

My invention relates to improvements in means for rapidly removing the peel of citrus fruit and particularly grape fruit. In the preparation of grape fruit for packing purposes it is essential that the inner skin which lies between the peel and the pulp be removed as well as the peel, as this skin is bitter and would spoil the flavor of the packed fruit. This inner skin cannot be removed by the ordinary method of peeling a citrus fruit such for instance as an orange, that is, by quartering the peel and then removing the same with the fingers, as such a method leaves this bitter inner skin adhered to the pulp of the fruit. Also, while the peel and this skin may be removed by the ordinary flat paring knife, this method is unsatisfactory as the paring knife in slicing the skin off, takes the skin and peel off in flat slices leaving portions of the skin adhered to the pulp which must afterwards be removed by scraping or in some other manner.

My invention is designed primarily to provide a means whereby the peel and inner skin may be expeditiously and cleanly removed with the minimum expenditure of time and labor.

Fig. 1 is a perspective view of the tool and

Fig. 2 is a view illustrating its application.

The knife for removing the peel of the fruit, as shown, is provided with a curved blade 1 provided with a suitable handle 2. This blade is preferably semi-circular or curved to substantially fit the contour of the fruit and its free end is rounded and sharpened as at 3. One edge of this knife is sharpened and I find that the best results are produced by giving a ground edge 4 to the knife in preference to a whetstone edge as a ground edge provides innumerable small saw teeth which assist materially in the cutting action of the knife.

The method of using the knife in the removing of the peel from the fruit is shown in Fig. 2. The first step is to trim or cut the peel from the two ends of the fruit, straight down and deep enough to remove the intermediate skin so that the pulp is exposed. The fruit is grasped in one hand by the operator and the knife forced through the peel at the side until it reaches a point between the inner skin and the pulp after which, by rotating the fruit and slightly oscillating the knife, the entire peel and inner skin may be removed in a single cutting operation, leaving the pulp fully exposed. The fruit may afterwards be divided for packing purposes.

I claim as my invention:

1. A knife for removing the peel of citrus fruit, comprising a blade curved to substantially conform to the contour of the whole fruit and having a cutting edge and provided with a handle by which the blade may be grasped, the curve of said blade commencing at the tip and extending substantially to the handle.

2. A knife for removing the peel of citrus fruit, comprising a blade curved to substantially conform to the contour of the whole fruit and having a sharpened cutting edge on one side and on the tip and provided with a handle by which the blade may be grasped.

In witness whereof, I RALPH POLK have hereunto set my hand at Haines City, Florida, this 13th day of December, A. D. one thousand nine hundred and twenty-two.

RALPH POLK.